Nov. 24, 1942.        E. W. GLACY        2,303,041
BRAKE
Filed March 7, 1941          2 Sheets-Sheet 1

INVENTOR;
EDWARD W. GLACY,
BY Romeyn A. Share
HIS ATTORNEY.

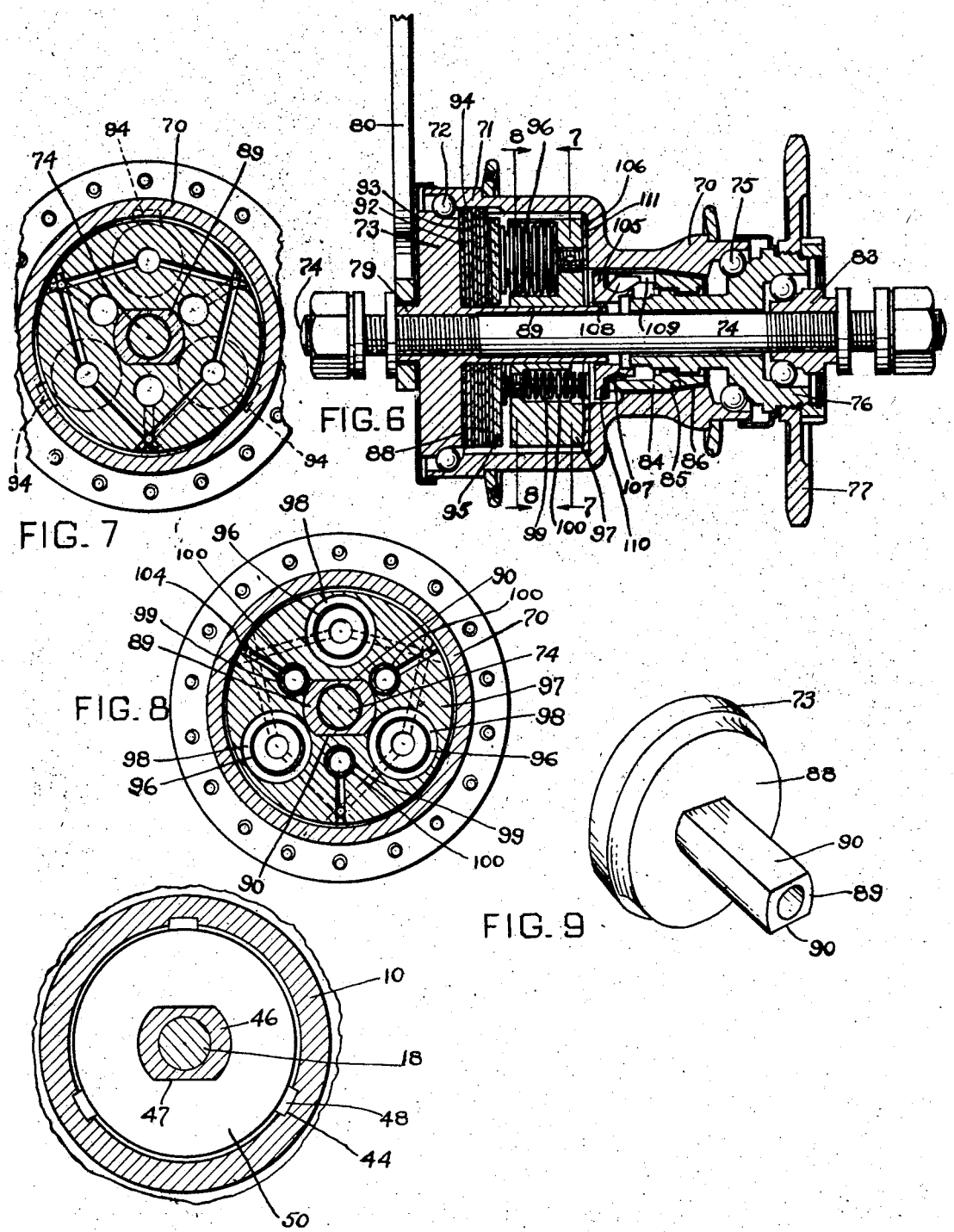

Patented Nov. 24, 1942

2,303,041

UNITED STATES PATENT OFFICE 2,303,041

BRAKE

Edward W. Glacy, Bristol, Conn., assignor to General Motors Corporation, Detroit, Mich., a corporation of Delaware Application March 7, 1941, Serial No. 382,185

14 Claims. (Cl. 192—6)

This invention relates to braking mechanisms and particularly to a coaster brake for the driving wheel of a vehicle, such as a bicycle.

An object is to provide an improved coaster brake of simplified construction and having a brake that is applied under the influence of fluid pressure.

Another object is to provide a braking mechanism which is normally actuated by fluid pressure and which is mechanically actuated by the same controls in the event of failure of the fluid pressure mechanism.

Another object is to provide in a fluid pressure operated brake mechanism an additional brake operating mechanism that is automatically brought into use during a braking operation in the event of insufficient braking application of the fluid pressure mechanism.

To these ends and also to improve generally upon devices of this character, the invention consists in the various matters hereinafter described and claimed. In its broader aspects, the invention is not necessarily limited to the specific constructions selected for illustrative purposes.

In the accompanying drawings:

Figure 5 is a diametrical section taken along the line 5—5 of Figure 1 and looking in the direction of the arrows;

Figure 6 is a view in axial section of another embodiment of the invention;

Figure 7 is a diametrical section taken along the line 7—7 of Figure 6 and looking in the direction of the arrows;

Figure 8 is a diametrical section taken along the line 8—8 of Figure 6 and looking in the direction of the arrows; and Figure 9 is a perspective view of the brake disc support employed in the Figure 6 embodiment.

Generally stated, I have provided a coaster brake for the driving wheel of a vehicle such as a bicycle; and this brake includes both a fluid pressure control and a mechanical control, these controls being mounted in a rotatable wheel hub 10 which contains a series of braking discs 11 and 12. Both the fluid pressure and the mechanical brake control mechanisms are operated by the usual rearward turning of a driving sprocket 13, and during a normal braking operation only the fluid pressure control mechanism actuates the brake. However, in the event that the fluid pressure control applies insufficient braking pressure when the driving sprocket 13 is rearwardly turned to a normal braking position, a further rearward movement of the sprocket actuates the mechanical braking control and provides an emergency brake. Hence, in the event of failure of the fluid pressure mechanism, the operator does not lose control of the vehicle but may still apply the brakes in the usual manner.

Figure 1:
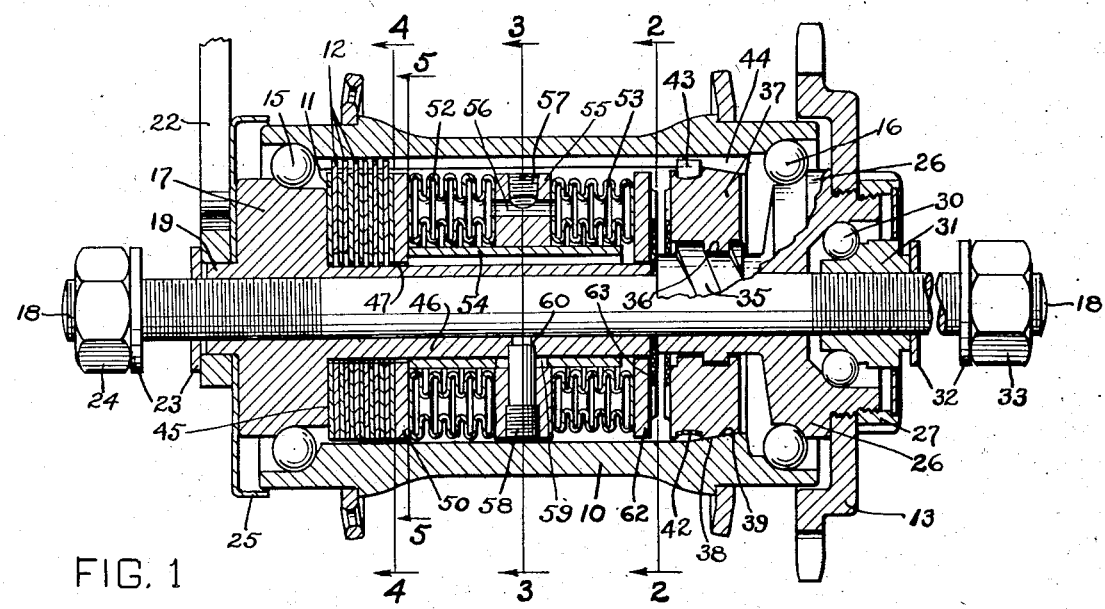
Figure 1 is an axial sectional view through one embodiment of the invention and taken along the lines 1—1 of Figures 2 and 3.
Figure 2:
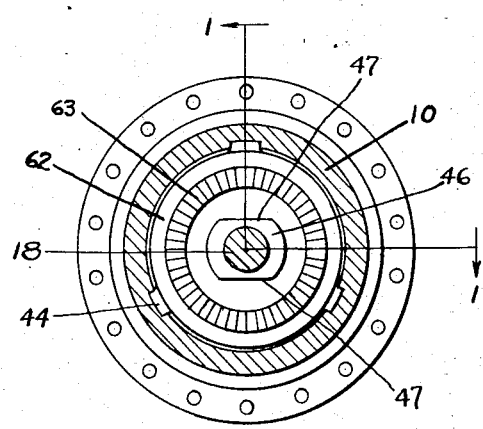
Figure 2 is a diametrical section taken along the line 2—2 of Figure 1 and looking in the direction of the arrows.
Figure 3:
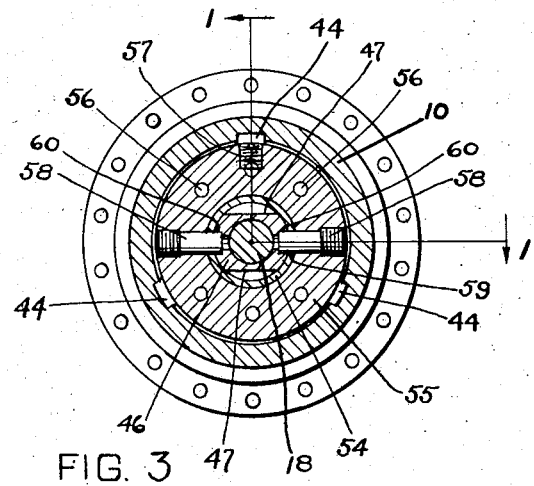
Figure 3 is a diametrical section taken along the line 3—3 of Figure 1 and looking in the direction of the arrows.
Figure 4:
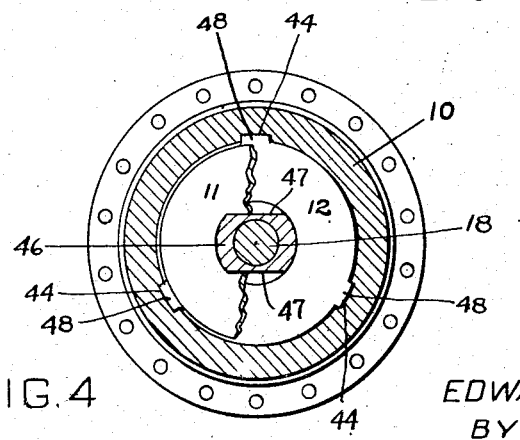
Figure 4 is a diametrical section taken substantially along the line 4—4 of Figure 1 and looking in the direction of the arrows.

In the embodiment of Figures 1 to 5 the wheel hub 10, which has the usual spoke flanges, is rotatably supported at its ends by rows of bearing balls 15 and 16, the bearing balls 15 of one row being carried by a non-rotatable brake disc support 17 that is threaded on an axle 18 extending through the wheel hub 10. This brake disc support 17 has a non-cylindrical extension 19 non-rotatably socketed in an anchoring arm 22 that is suitably held from rotation, as by clamping to a bicycle frame not shown. A frame member (not shown) is clamped between a pair of axle washers 23 by a nut 24, and a dust guard 25, secured to the brake disc support 17, overlies an end of the wheel hub 10.

The bearing balls 16 of the other row run on a driving sleeve 26 that is rotated by the driving sprocket 13 threaded thereon and locked in position by a nut 27. This driving sprocket 13 is preferably dished so that it also serves as a dust guard which overlies the end of the wheel hub 10 and protects the bearing balls 16 from dust and dirt. A row of bearing balls 30, which rotatably support the driving sleeve 26, roll on a cone 31 adjustably threaded on the axle 18, and a frame member (not shown) is clamped over the axle between the washers 32 by an axle nut 33. The driving sleeve 26 has steep pitch threads 35 that matingly engage similar threads 36 on an axially shiftable connector 37 provided with a conical serrated clutch face 38 arranged for driving engagement with a conical clutch face 39 on the wheel hub 10 when the driving sprocket 13 is rotated forwardly. A substantially C-shaped lag spring 42, provided with the usual out-turned ends 43 that are slidably received in two of the longitudinally extending hub keyways 44, frictionally embraces the connector 37 in an annular groove so that the relative rotation of the driving sleeve 26 and the wheel hub 10 will tend to axially shift the connector on the driving sleeve. When the forwardly driving sprocket rotation is stopped, the wheel hub 10 continues to turn and the connector 37 is axially shifted away from hub-driving engagement to a coasting position, and a backward rotation of the driving sprocket 13 shifts the connector 37 beyond the coasting position to a braking position as will be later described.

The brake disc support 17 has a shoulder 45 from which axially projects a reduced tubular portion 46 on which are slidably mounted the series of inner and outer brake discs 11 and 12 in alternating relation. I preferably provide the tubular portion 46 with flat side faces 47 which are slidably engaged by similar flat portions in the bores of the inner brake discs 11 to prevent these inner brake discs from rotation, and the outer brake discs 12, which rotate with the wheel hub 10, have outwardly projecting lugs 48 that slide within the hub keyways 44.

A brake applicator plate 50, in the general form of a flat washer, matingly fits over the sleeve portion 46 for a non-rotatable axially slidable movement towards and from the brake discs 11 and 12, and this brake applicator plate is urged into braking position either by a fluid pressure mechanism which includes a pair of co-operating longitudinally expansible metal bellows 52 and 53, commonly known as "Sylphons," or by a mechanically shiftable sleeve 54 actually slidable on the tubular portion 46. The "Sylphons" 52 and 53 are annular in form and surround the sleeve 54 within the wheel hub 10. The inner ends of these "Sylphons" are sealingly secured as by solder to a central annular head 55 that slidably receives the sleeve 54, and this head has a plurality of ports 56 through which fluid may freely flow from one "Sylphon" to the other. The "Sylphons" are completely filled before installation in the wheel hub with a suitable non-compressible fluid through a passage in the head and communicating with one of the ports 56 and closed by a threaded plug 57. The head 55 is demountably and rigidly secured to the tubular portion 46 by a pair of opposed studs 58 threaded in the head 55 and having cylindrical inner ends passing through longitudinally disposed slots 59 in the sleeve 54 and bottoming in seats 60 in the tubular portion 46. Hence, it will be appreciated that my complete fluid pressure system is a sealed unit which may be demountably positioned in the hub as a unit-handling assembly.

The outer end of the "Sylphon" 52 abuts against the brake applicator plate 50 and the outer end of the "Sylphon" 53 abuts against a brake actuator plate 62 that matingly and slidably fits over the end of the tubular portion 46 adjacent to the connector 37. If desired, the ends of the "Sylphons" 52 and 53 may be respectively secured as by soldering to the plates 50 and 62. The brake actuator plate 62 has incline-faced teeth 63 adapted to intermesh with corresponding teeth on the connector 37. When the sprocket 13 is turned rearwardly, the connector 37 is shifted towards the left as viewed in Figure 1 and into toothed engagement with the brake actuator plate 62. This movement forces the brake actuator plate towards the left to compress the "Sylphon" 53 which results in a longitudinal expansion of the "Sylphon" 52 that causes a braking action by clamping the relatively rotatable braking discs into lateral frictional engagement between the brake applicator plate 50 and the shoulder 45. I preferably provide the "Sylphon" 53 of smaller diameter than that of the "Sylphon" 52 so that the slight pressure required to longitudinally compress the "Sylphon" 53 and to force the fluid into the "Sylphon" 52 will be amplified into a strong braking pressure applied by the "Sylphon" 52 through a shorter distance of movement of the "Sylphon" 52.

In the event of failure of the fluid pressure system, or, if the fluid pressure due to wear of parts or other causes should become insufficient to properly apply the brake, the mechanical brake is automatically operated by a further rearward movement of the sprocket 13 beyond its normal braking position, and this further movement continues to axially shift the connector 37 and the brake actuator plate 62 until the brake actuator plate engages and shifts the sleeve 54 into brake operating engagement with the brake applicator plate 50. During a normal fluid pressure actuated brake operation, the sleeve 54 is spaced sufficiently from the brake actuator plate 62 so that it does not transmit any braking action. The slots 59 are of sufficient length so that the sleeve 54 is not restricted by the studs 58 during a mechanical application of the brake.

Figures 6 to 9 show another embodiment of this invention wherein a wheel hub 70, which has the usual spoke flanges, has an enlarged end 71 supported by a row of bearing balls 72 running in a raceway on a brake disc support 73 threaded on an axle 74, and the small end of the wheel hub 70 is carried by a row of bearing balls 75 that run on a driving sleeve 76 upon which is secured the usual driving sprocket 77. A non-cylindrical extension 79 of the brake support is non-rotatably socketed in an anchoring arm 80 that is suitably held from rotation. Similar to the previously described embodiment, the driving sleeve 76 is supported by a row of bearing balls on a cone 83 threaded on the axle 74, and steep pitch threads on the driving sleeve 76 engage similar threads on a connector 84 which has a conical clutch face 85 movable into and out of driving engagement with a similarly conical hub clutch face 86.

The brake disc support 73 has a shoulder 88 from which projects a sleeve portion 89 that receives the axle 74 and which has opposed flat sides 90. A series of alternating inner and outer brake discs 92 and 93 are slidably mounted on the sleeve portion 89, and these inner and outer discs are respectively non-rotatably keyed to the sleeve portion 89 and to keyways 94 in the hub enlargement 71 in the same general manner as described with relation to the embodiment of Figures 1 to 5. A brake applicator plate 95 is slidably and non-rotatably fitted over the sleeve portion 89 for axial movement towards and from the brake discs, and this plate is urged into braking position either by a fluid pressure mechanism which includes a plurality of "Sylphons" 96 that project towards the brake discs from recesses 98 in a carrier 97, or by a mechanically actuated shifting of the carrier itself into engagement with the brake applicator plate.

The carrier 97, which slidably and non-rotatably fits over the flatted sleeve portion 89, has a plurality of recesses 99 from which rearwardly extend a plurality of "Sylphons" 100 that are smaller in diameter than the "Sylphons" 96. Each "Sylphon" has a threaded head at its inner end fastened to the carrier 97 and passages in the carrier and in these heads provide for free communication of fluid between all of the "Sylphons." A removable plug 104 communicates with one of these passages so that all of the "Sylphons" and these passages may be completely filled with a suitable non-compressible fluid. With this construction, my fluid pressure system constitutes a sealed unit-handling assembly that is demountably positioned in the hub without affecting the fluid pressure connections. A brake actuator 105 is slidable but non-rotatably mounted on the end of the sleeve portion 89 between the flat end face 106 of the carrier 97 and the connector 84, and a C-shaped lag spring 107 that embraces the brake actuator has an ear 108 received in a keyway 109 of the connector to prevent the connector 84 from rotation. The brake actuator 105 and the connector 84 are also provided with interengageable and incline-faced teeth 110 generally corresponding with the teeth 63 of the embodiment of Figure 1.

When the forwardly driving rotation of the sprocket 77 is stopped, the connector 84 shifts out of hub driving engagement along the threaded driving sleeve 76 to the coasting position of Figure 6. When the sprocket is turned rearwardly, the connector 84 is shifted further towards the left as viewed in Figure 6 and into toothed engagement with the brake actuator 105 which is then forced into longitudinally compressive engagement with the "Sylphons" 100 thereby forcing fluid into and expanding the "Sylphons" 96 which in turn press the brake applicator plate 95 into braking position. A suitable washer 111 is placed between the face 106 and the adjacent hub shoulder to prevent scoring of the carrier on the hub. The "Sylphons" 96 are larger than the "Sylphons" 100 so that the braking pressure applied at the sprocket 77 will be amplified at the brake discs. The expansion of the "Sylphons" 96 into braking position first shifts the carrier 97 rearwardly into engagement with the washer 111 to axially locate the carrier during the hydraulic braking operation. Also, the non-rotatable pressure engagement of the carrier 97 against the washer 111, which is supported by the rotatable hub, effectively adds to the braking operation.

In the event that the normal fluid pressure operated brake application should become insufficient due to leakage in the fluid pressure system or due to other causes, a further rearward turning of the sprocket will apply the mechanically actuated emergency brake while the fluid pressure brake is still being applied. To accomplish this, the further rearward rotation of the sprocket results in a continued shift of the connector 84 and the brake actuator plate 105 until this brake actuator plate engages the carrier face 106 and bodily shifts the carrier 97 against the brake applicator plate 95 to cause a mechanically applied emergency brake.

I claim:

1. In a device of the character indicated, a rotatable wheel hub, a brake within said hub, hydraulically actuated brake applying means within the hub, independent mechanically actuated brake applying means within said hub, and a brake actuator plate in the hub for operating both said hydraulic and mechanical brake applying means, said brake actuator plate operating one of said brake applying means in subsequent relation to said other brake applying means.

2. In a device of the character indicated, a rotatable hub, a brake therefor, fluid pressure actuating member for applying said brake, a separately movable mechanically actuated brake applying member, and brake applying means in said hub and operatively associated with both of said members, said means engaging one of these brake applying members before it becomes operatively associated with said other member.

3. In a device of the character indicated, a rotatable hub, a brake therefor at one end of said hub, fluid pressure actuating mechanism within the hub for applying said brake, a sleeve member movable independently of said fluid pressure mechanism into and out of brake operating position, and a brake applying member operatively associated with said mechanism and with said sleeve, said member operating the fluid pressure actuating mechanism during an initial movement and additionally shifting the sleeve into brake operating position during a further movement.

4. In a bicycle wheel, a rotatable wheel hub, a sprocket at one end of said hub and arranged to drive said hub, a brake within the hub, fluid pressure actuated mechanism arranged to expand within the hub into a brake applying position, a mechanically actuated mechanism independent of said fluid pressure mechanism and arranged to apply said brake and means operatively connecting said sprocket to each of said mechanisms.

5. In a bicycle, a rotatable wheel hub, a brake within said hub, a pair of intercommunicating bellows filled with a non-compressible fluid, one of said bellows being operatively associated with said brake, and brake operating means arranged to compressively engage said other bellows and cause the first mentioned bellows to apply the brake.

6. In a bicycle, a rotatable wheel hub, a brake at one end of said hub, a driving sprocket at the other end of said hub, and a fluid-filled hydraulically brake operating member expansibly movable between said brake and said sprocket, means demountably fastening said member as a fluid-filled sealed unit within said hub, and one end of said member being operatively associated with the brake and the other end being operatively associated with said sprocket.

7. In a bicycle, a wheel hub, a non-rotatable brake support in said hub, a brake between said support and said hub, a pair of interconnected fluid-filled bellows demountably secured at their adjacent inner ends as a sealed unit to said support, the outer end of one of said bellows being expansible into brake applying relation, and a brake control member compressively engageable with the other end of said other bellows.

8. In a bicycle, a rotatable wheel hub, a non-rotatable brake support within one end of said hub, hub braking means between said support and the hub, a pair of fluid-filled intercommunicating bellows between said support and the hub, a head common to each of said bellows and demountably carried by said support, a brake actuator slidably mounted on the support and engageable with one end of one of said bellows, and the other end of said other bellows being operatively associated with said brake.

9. In a bicycle, a rotatable wheel hub, a non-rotatable brake support in said hub, a brake operatively associated with said hub, a head demountably fastened to the support, a pair of inter-communicating bellows filled with a non-compressible fluid and sealingly secured in unit-handling relation with and projecting outwardly from said head in opposed relation, the outer end of one of said bellows being operatively associated with said brake, and a movable brake actuator member operatively engageable with the other end of said other bellows.

10. In a bicycle, a rotatable wheel hub, a non-rotatable brake support extending into said hub, a brake between said support and said hub, a carrier demountable on said support, a pair of intercommunicating fluid filled bellows in unit-handling relation with said carrier and respectively projecting outwardly therefrom in opposed relation, one of said bellows being larger than said other bellows and having an end operatively engageable with said brake, and a shiftable brake actuator member operatively engageable with the outer end of said smaller bellows.

11. In a bicycle coaster brake, a rotatable hub, a brake therefor, a movable brake actuator member remote from said brake, a bellows assembly comprising a plurality of co-operating bellows filled with a hydraulic brake fluid, means demountably supporting the bellows assembly as a sealed unit which is in brake operative engagement at one end and which is engageable with the brake actuator member at its other end, and an independently movable brake energizing sleeve which is shifted by the brake actuator member into additional brake operating engagement after said bellows has been displaced a predetermined extent by the brake actuator member.

12. In a bicycle, a rotatable wheel hub, a brake therefor, a carrier shiftable into and out of brake engagement, a pair of interconnected fluid filled bellows mounted on the carrier in unit handling relation therewith and projecting outwardly from the carrier in opposed relation, the outer end of one of said bellows being operatively associated with said brake, a movable brake actuator operatively engageable with the outer end of said other bellows, and said brake actuator being arranged to additionally shift the carrier into brake operating engagement when the brake actuator reaches a predetermined position of its movement.

13. In a bicycle, a rotatable wheel hub, a brake therefor, a shoulder in said hub, a non-rotatable carrier shiftable from said shoulder and into and out of brake engagement, a fluid filled bellows mounted on the carrier and expansible into brake operative relation, a second fluid filled bellows projecting from the carrier and communicating with said first mentioned bellows, a brake actuator member shiftable into and out of compressible engagement with said second mentioned bellows, and said brake actuator member positively engaging and shifting the carrier itself into brake operative engagement after said second mentioned bellows had been compressed a predetermined extent.

14. In a bicycle coaster brake, a rotatable wheel hub, a non-rotatable support extending into said hub, a plurality of brake discs alternately slidably keyed to said support and to said hub and shiftable into and out of braking engagement, a head demountably fastened to said support, a pair of annular fluid filled interconnected metal bellows sealingly secured to and projecting from said head in opposed relation, the outer end of one of said bellows being operatively arranged to shift the brake discs into braking engagement, a brake actuator plate slidably mounted on the support and operatively engageable with the outer end of said other bellows, and a brake operating sleeve freely slidable on said support and within said bellows, said sleeve being operatively engaged by the brake actuator plate and shifted into brake operating engagement when the brake actuator plate reaches a predetermined position of its movement.

EDWARD W. GLACY.